United States Patent Office 2,986,453
Patented May 30, 1961

2,986,453
DIAGNOSTIC COMPOSITIONS

Galen F. Collins, Elkhart, Ind., assignor to Miles Laboratories, Inc., Elkhart, Ind., a corporation of Indiana No Drawing. Filed Nov. 13, 1957, Ser. No. 696,046

10 Claims. (Cl. 23—253)

This invention relates to diagnostic compositions for the detection of albumin in liquids, and relates particularly to indicator bodies or compositions having utility in the qualitative and semi-quantitative determination of albumin in body fluids, such as urine.

In tests heretofore devised for the determination of albumin in body fluids, use has been made of pH indicators having a protein affinity, as a consequence of which they exhibit the phenomenon of "protein error" whereby, in solutions containing protein, such indicators undergo their characteristic acid-to-base color change at a lower pH value than that at which they will change color in the absence of protein. That is to say, an indicator which exhibits "protein error" will, in a solution containing protein, under certain conditions show its basic color although the pH of the solution may actually be well below that at which the color change normally occurs, and the extent to which the color of the solution is changed is an indication of the amount of protein in the solution. The mechanism by which the presence of protein enables certain dyes to exhibit their basic color in solutions having a pH below the acid-to-base color-change point is not clearly understood, but it is known that protein is limited in its range and capacity for bringing about this effect. Specifically, this color-change of the indicator, due to the presence of protein, may be effected only if the solution being tested has a final pH not substantially lower than about 1.25 pH units below the pH at which the normal acid-to-base color-change of the indicator occurs.

Diagnostic compositions for carrying out tests for albumin have been made using a base material, such as strips of filter paper, which serve as a carrier for the dye and for a buffer which is effective, when the carrier is wetted with a urine specimen, to maintain the carrier and dye at a pH value adjacent to, but on the acid side of, the point at which the dye changes from its acid color to its basic color. Such compositions when moistened with a liquid to be tested, do not change color (i.e., they continue to show the acid color of the dye) if the liquid does not contain protein; on the other hand, if the liquid does contain protein, the dye in the composition will change to its alkaline color because of the "protein error."

Although diagnostic compositions of the type just described are quite satisfactory and give reliable results in most instances, it has been found that they may falsely indicate the presence of albumin in buffered alkaline solutions. It is believed that the reason for such "false positives" is that the alkalinity of the urine or other test solution is such that the amount of buffer which it is possible to incorporate into such strip test compositions is insufficient to regulate the pH to the proper level. It is recognized that such a urine may be adjusted with an acid to a pH range within which the buffer present in the test strip will be adequate to maintain the pH required, thereby eliminating a false positive reading. However, this is not practicable when performing the test on a clinical scale.

It would be desirable to have a single test composition, in convenient strip form, possessing sufficient buffering action to avoid the errors just discussed, and give a reliable indication of the albumin content of any urine, however alkaline it may be. Accordingly, it is an object of the invention to provide a diagnostic composition containing an indicator dye having a protein affinity which will afford quick, convenient, and accurate determination of albumin in liquids, even when the pH of the latter is as high as 9.5.

Other objects and advantages of the invention will be apparent from the following description thereof.

The underlying basis of this invention is my discovery that the aforementioned false indication of albumin in alkaline liquids given by diagnostic compositions using a buffer and a dye having a protein affinity, as described briefly above, may be precluded by incorporating in such composition a small amount of an anionic surface active agent. The manner in which the anionic surface active agent works in bringing about this unexpected result is not known, but it is thought that these agents may increase the effectiveness of the buffer in the composition because of their strong surface activity. However, none of the cationic or non-ionic surface active agents seems to produce this important effect on the test.

A diagnostic composition according to the present invention comprises an indicator dye which exhibits "protein error," i.e., tetrabromophenolphthalein ethyl ester, a buffer for maintaining the indicator at a pH adjacent to, but on the acid side of, its acid-to-base color-change point when the composition is wetted with the liquid being tested, and an anionic surface active agent, all of such ingredients being carried by a bibulous base material or carrier, such as filter paper. I prefer to prepare my diagnostic compositions by dissolving the dye, buffer and anionic surface active agent in a suitable solvent or mixture of solvents and impregnating a bibulous body (e.g., a strip of filter paper) with the resulting solution, thereafter drying the impregnated bibulous body.

In general, satisfactory diagnostic compositions for the determination of albumin may be prepared by saturating suitable absorbent strip material with a solution comprising between about 0.0025% and about 0.1% of tetrabromophenolphthalein ethyl ester indicator, between about 10% and about 30% of the buffer, and between about 0.0025% and about 0.05% of the anionic surface active agent, the remainder being a volatile solvent for the components, and then drying the saturated strip. As indicated by the foregoing proportions, the anionic surface active agent is present in the compositions to the extent of about 0.008% to about 0.5% of the total weight of the solids in the impregnating solution. A general formula within the foregoing broad definition of my impregnating solution is as follows:

*Example 1*

| | Gm. |
|---|---|
| Ethyl ester of tetrabromophenolphthalein | 0.0005 to 0.020 |
| Dioctyl ester of sodium sulfosuccinate | 0.0005 to 0.01 |
| Citrate buffer (sodium citrate dihydrate and citric acid) | 2 to 6 |
| Solvent (alcohol and water), q.s. to about 20 ml. | |

Although I have found the dioctyl ester of sodium sulfosuccinate to be quite effective in eliminating false indications of albumin in alkaline test solutions, and therefore prefer this compound as the anionic surface active agent of my compositions, other anionic surface active agents may be used satisfactorily for this purpose, if desired, such as decyl benzene sodium sulfonate or sodium lauryl sulfate.

The buffer used in my compositions may, of course, be varied somewhat, but the concentration range of the buffer noted in the above formula (Example 1) will usually be satisfactory, in the presence of the anionic surface active agent, for buffering the indicator dye to the acid side of its acid-to-base color-change point, as desired. As indicated in Example 1, I prefer to use a buffer composed of sodium citrate dihydrate and citric acid. Preferably, the sodium citrate and citric acid are used in such proportions, relative to each other, that the final solution used to impregnate the strip material will have a pH in the desired pH range on the acid side of the acid-to-base color-change point of the dye. Using equal parts of sodium citrate dihydrate and citric acid in the formulation of Example 1, to the extent of about 10% to about 30%, by weight, of the impregnating composition, gives a pH of about 3.5; one part of sodium citrate dihydrate to 2.3 parts of citric acid produces a pH of about 2.7 in the solution prepared according to Example 1. Other proportions of sodium citrate relative to citric acid may be used to produce buffered solutions at other pH values, as is well known in the art. The indicator in my compositions, i.e., tetrabromophenolphthalein ethyl ester exhibits its acid-to-base color-change in a convenient range of about pH 3.5 to about pH 4.0.

The ranges of concentration of the components set forth in Example 1 define workable concentrations thereof for producing diagnostic compositions which are operative to provide reliable indications of the albumin content of questioned liquids. However, the proportions of some of the components may be varied somewhat without destroying the operativeness of the compositions. Thus, less dye may be used in the compositions than the smaller amount indicated in Example 1, but if this is done the color of the composition is correspondingly weakened. If more dye is used than that indicated by the higher end of the range in Example 1, the sensitivity of the test is reduced. As for the anionic surface active agent, if more of this material is used than indicated in Example 1, the sensitivity of the test is decreased; if substantially less surface active agent is used than the smaller amount indicated in Example 1, the final compositions will be as unreliable as far as "false positives" of albumin are concerned as if no surface active agent had been used. Accordingly, for the components shown in Example 1, the preferred proportion of the anionic surface active agent in my compositions is between about 0.025% and about 0.05% based on the total weight of the non-volatile components, exclusive of the bibulous carrier.

Specific embodiments of my invention are illustrated in the following examples:

*Example 2*

Ethyl ester of tetrabromophenolphthalein__mgm__ 2.0
Dioctyl ester of sodium sulfosuccinate_____mgm__ 6.0
Citrate buffer:
    Sodium citrate dihydrate _____gm__ 2.5
    Citric acid _____gm__ 2.5
Ethyl alcohol _____ml__ 10
Water, q.s. to 20 ml.

*Example 3*

Ethyl ester of tetrabromophenolphthalein__mgm__ 2.0
Dioctyl ester of sodium sulfosuccinate_____mgm__ 2.0
Citrate buffer:
    Sodium citrate dihydrate_____gm__ 1.5
    Citric acid_____gm__ 3.5
Ethyl alcohol_____ml__ 10
Water, q.s. to 20 ml.

In preparing the diagnostic compositions of the invention, the anionic surface active agent and the buffer components are dissolved in a portion of the water. The dye is dissolved in the alcohol and the resulting solution added to the solution of buffer and surface active agent, water being added to make up the desired final volume. Strips of filter paper are dipped into the resulting solution and dried. A medium thickness of filter paper (about 0.025 inch) is preferred. After drying, the impregnated strips are ready for use.

In use, an impregnated strip, made in accordance with the invention, is dipped into the liquid specimen to be tested, and quickly removed to prevent leaching out of the buffer and the anionic surface active agent. Since in all cases the dye in the dry compositions exhibits its acid color, and since the buffer action (presumably augmented by the anionic surface active agent) maintains the compositions on the acid side of the acid-to-base color-change point of the dye, even after it has been wetted by the test specimen, a negative specimen will produce no color-change in the dye. However, a liquid speciment containing albumin will, because of the effect of "protein error," cause the dye to assume its alkaline color, by which the presence of albumin is clearly indicated. The presence in my compositions of an anionic surface active agent eliminates false positive indications of albumin in liquids having a pH as high as 9.5, and assures the reliability of the test.

It should also be noted that the use of the anionic surface active agent permits the use of a composition having a higher pH than is ordinarily possible without the false positives that would ordinarily be associated with such higher pH. Strips prepared with a solution of higher pH are more stable and are thus more desirable. For example, strips prepared from a solution having a pH of 2.7 fail to give a satisfactory test after exposure for two days to 100% relative humidity at 82° C. while strips having been prepared from a solution having a pH of 3.5 gave a good test after sixteen days' exposure to the same conditions.

I claim:

1. In a diagnostic composition for the determination of albumin in liquids, which composition includes as an indicator the ethyl ester of tetrabromophenolphthalein and a citrate buffer for maintaining said indicator at a pH on the acid side of its acid-to-base color-change point when the composition is wetted with the liquid being tested, the improvement which comprises the inclusion in said composition of a minor proportion of an anionic surface active agent.

2. A diagnostic composition in accordance with claim 1 wherein said anionic surface active agent is selected from the group consisting of the dioctyl ester of sodium sulfosuccinate, decyl benzene sodium sulfonate and sodium lauryl sulfate.

3. A diagnostic composition in accordance with claim 1 wherein said anionic surface active agent is the dioctyl ester of sodium sulfosuccinate, and is present in an amount between about 0.008% and 0.5% of the total weight of the recited ingredients.

4. In a diagnostic composition for determining albumin in liquids, comprising a bibulous carrier incorporating the solids remaining from a previous impregnation of said carrier with a solution of the ethyl ester of tetrabromophenolphthalein and a citrate buffer for maintaining the said ethyl ester of tetrabromophenolphthalein at a pH on the acid side of its acid-to-base color-change point when said composition is wetted with the liquid being tested, the improvement which comprises the inclusion in said composition of a minor proportion of the dioctyl ester of sodium sulfosuccinate.

5. A diagnostic composition in accordance with claim 4, wherein said dioctyl ester of sodium sulfosuccinate is present in an amount between about 0.008% and about 0.5% of the total weight of the recited solid ingredients of said composition, exclusive of said carrier.

6. A diagnostic composition for determining albumin in liquids, comprising a dry bibulous carrier incorporating the non-volatile components remaining from a previous impregnation of said carrier with a solution consisting essentially of between about 0.0025% and about 0.1% of tetrabromophenolphthalein ethyl ester indicator, between about 10% and about 30% of a buffer for maintaining said carrier and said indicator at a pH adjacent, to, but on the acid side of, the acid-to-base color-change point of said indicator when the composition is wetted with the liquid being tested, and between about 0.0025% and about 0.05% of an anionic surface active agent, in a volatile solvent for said components, the proportions of said components being on the wet basis.

7. Means for determining albumin in liquids, comprising a bibulous body carrying as an indicator the ethyl ester of tetrabromophenolphthalein, a buffer consisting essentially of sodium citrate dihydrate and citric acid for maintaining said body and indicator at a pH adjacent to, but on the acid side of, the acid-to-base color-change point of said indicator when said body is wetted with the liquid being tested, and a minor proportion, relative to the combined weights of said indicator and buffer, of an anionic surface active agent selected from the group consisting of the dioctyl ester of sodium sulfosuccinate, decyl benzene sodium sulfonate and sodium lauryl sulfate.

8. A diagnostic composition for determining albumin in liquids, comprising a bibulous carrier incorporating the non-volatile components remaining from a previous impregnation of said carrier with a solution of the following composition:

| | Gm. |
|---|---|
| Ethyl ester of tetrabromophenolphalein | 0.0005 to 0.020 |
| Dioctyl ester of sodium sulfosuccinate | 0.0005 to 0.01 |
| Citrate buffer (sodium citrate dihydrate and citric acid) | 2 to 6 |
| Solvent (alcohol and water), q.s. to 20 ml. | |

9. A diagnostic composition for determining albumin in liquids comprising an absorbent carrier in strip form incorporating the non-volatile components remaining from a previous impregnation of said carrier with a solution of the following composition:

Ethyl ester of tetrabromophenolphthalein ___mgm__ 2.0
Dioctyl ester of sodium sulfosuccinate _____mgm__ 6.0
Citrate buffer:
    Sodium citrate dihydrate _____gm__ 2.5
    Citric acid _____gm__ 2.5
Ethyl alcohol _____ml__ 10
Water, q.s. to 20 ml.

10. A diagnostic composition for determining albumin in liquids, comprising an absorbent carrier in strip form incorporating the non-volatile components remaining from a previous impregnation of said carrier with a solution having the following composition:

Ethyl ester of tetrabromophenolphthalein ___mgm__ 2.0
Dioctyl ester of sodium sulfosuccinate _____mgm__ 2.0
Citrate buffer:
    Sodium citrate dihydrate _____gm__ 1.5
    Citric acid _____gm__ 3.5
Ethyl alcohol _____ml__ 10
Water, q.s. to 20 ml.

References Cited in the file of this patent

UNITED STATES PATENTS

| 2,178,550 | Acree | Nov. 7, 1939 |
| 2,838,377 | Fonner | June 10, 1958 |
| 2,848,308 | Free | Aug. 19, 1958 |
| 2,897,058 | Galat | July 28, 1959 |

OTHER REFERENCES

Cohn: "Indicators and Test Papera," pp. 201, 207, 180 and 181, 1st ed., 1899.

Feigl et al.: "Michrochimika Acta," vol. II, 1937, pp. 107–110.

Valko: "Annals N.Y. Acad. of Science," vol. 46, Mar. 15, 1946, pp. 463, 472.

Bennewitz: "Fette, Seif., Anstrichmitt," 1956, vol. 58, pages 832–833.